United States Patent
Kim

[11] Patent Number: 6,118,819
[45] Date of Patent: Sep. 12, 2000

[54] MPEG-2 TRANSPORT STREAM DATA DETECTION DEVICE AND METHOD

[75] Inventor: Hyeong-Geun Kim, Kyoungki-do, Rep. of Korea

[73] Assignee: Hyundai Electronics Ind Co., Ltd., Kyungki-do, Rep. of Korea

[21] Appl. No.: 08/882,218

[22] Filed: Jun. 25, 1997

[30] Foreign Application Priority Data

Jun. 25, 1996 [KR] Rep. of Korea ...................... 96-23474

[51] Int. Cl.[7] .............................. H04N 7/10; H04B 1/66
[52] U.S. Cl. ............................ 375/240; 348/7; 348/21; 348/460; 370/392
[58] Field of Search ............................ 348/21, 460, 461, 348/464, 465, 466, 845.1, 845, 423, 7, 12, 512; 370/392, 474, 516, 522; 714/775; 375/240

[56] References Cited

U.S. PATENT DOCUMENTS

| | | | |
|---|---|---|---|
| 5,365,272 | 11/1994 | Siracusa | 348/425 |
| 5,579,317 | 11/1996 | Pang et al. | 370/94.1 |
| 5,598,415 | 1/1997 | Nuber et al. | 348/465 |
| 5,668,810 | 9/1997 | Cannella, Jr. | 370/392 |
| 5,703,887 | 12/1997 | Heegard et al. | 714/775 |
| 5,790,543 | 8/1998 | Cloutier | 370/474 |
| 5,805,602 | 9/1998 | Cloutier et al. | 370/516 |
| 5,828,416 | 10/1998 | Ryan | 348/512 |
| 5,959,659 | 9/1999 | Dokic | 348/7 |

*Primary Examiner*—Chris S. Kelley
*Assistant Examiner*—Gims Philippe
*Attorney, Agent, or Firm*—Reed Smith Shaw & McClay LLP

[57] ABSTRACT

An MPEG-2 transport stream packet detection device includes a controller for generating a detection start control signal and a series/parallel output control signal, and a sync detector for detecting an MPEG-2 transport stream packet sync from MPEG-2 transport stream data transmitted from the network according to the detection start signal from the controller, and a packet counter for counting a predetermined number of bytes according to a sync detection signal from the sync detector and sending a packet reception completion signal to the sync detector when finishing counting the predetermined number of bytes during a declaration of the detection signal, and a bit counter for counting a predetermined number of bits according to the sync detection signal from the sync detector and generating a signal for converting series data to parallel data when finishing counting the bits during the declaration of the detection signal, and a buffer for converting the series data and clock from the sync detector into parallel data and strobe signal according to the signal generated by the bit counter, and outputting the data and clock in series or parallel according to the series/parallel output control signal generated by the controller.

7 Claims, 1 Drawing Sheet

MPEG-2 TRANSPORT STREAM DATA DETECTION DEVICE AND METHOD

BACKGROUND OF THE INVENTION

1. Field of the Invention

The present invention relates to a system providing video/voice/data, such as subscriber terminals for serving a video on demand service and a direct broadcasting by satellite service. Specifically, this invention is an MPEG-2 transport stream packet detection device and its method for precisely detecting data and clocks from MPEG-2 transport streams to be transmitted.

2. Discussion of Related Art

Usually, a device for detecting MPEG-2 transport stream packets detects the signals received one time so as to detect a sync byte, and restores data and clock referring to the detected sync byte. A method of outputting the data and clock restored is fixed to series or parallel method according to the characteristic of the system. To selectively output the data and clock restored in series or parallel method, a series/parallel converter or a parallel/series converter must be additionally installed.

Since this usual MPEG-2 transport stream detection device detects a sync byte just one time to restore data and clock, its reliability is low, thus it is difficult to generate stable data and clock. A converter, such as series/parallel converter or parallel/series converter, must be added to selectively output the data and clock in series or parallel, thus the system's configuration is complicated, making the products uneconomical.

SUMMARY OF THE INVENTION

Accordingly, the present invention is directed to an MPEG-2 transport stream packet detection device and its method that substantially obviates one or more of the limitations and disadvantages of the related art.

An object of the present invention is to provide an MPEG-2 transport stream packet detection device and its method for precisely detecting a packet sync pattern from MPEG-2 transport streams to stably generate data and clock, thus applying it to video/voice/data service systems, such as subscriber terminals for a video on demand service and direct broadcasting by satellite service.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an MPEG-2 transport stream packet detection device consists of: a controller for receiving signals determining a detection time point and a series/parallel output method, and generating a detection start control signal and a series/parallel output control signal; a sync detector for detecting an MPEG-2 transport stream packet sync from MPEG-2 transport stream data transmitted from the network according to the detection start signal from the controller; a packet counter for counting a predetermined number of bytes according to a sync detection signal from the sync detector and sending a packet reception completion signal to the sync detector when finishing counting the predetermined number of bytes during a declaration of the detection signal; a bit counter for counting a predetermined number of bits according to the sync detection signal from the sync detector and generating a signal for converting series data to parallel data when finishing counting the bits during the declaration of the detection signal; and a buffer for converting the series data and clock from the sync detector into parallel data and strobe signal according to the signal generated by the bit counter, and outputting the data and clock in series or parallel according to the series/parallel output control signal generated by the controller.

The method for achieving the present invention includes the steps of: searching an MPEG-2 transport stream input for a sync byte in units of bit in a hunt state; progressing to a search state if the sync byte is detected, searching input data for the sync byte in units of transport packet, and increasing the number of the transport packets by a predetermined number when finding out the sync byte; progressing to a win state if the number of transport packets is more than a predetermined number in the search state; and keeping the win state if the sync byte is normally found at every packet, and progressing to the hunt state if the sync byte is not found at every packet to restart a detection of the sync byte.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram of an MPEG-2 transport stream packet detector according to the present invention; and FIG. 2 shows a transition of packet detection states according to the reception state of MPEG-2 transport stream, according to the present invention.

DETAILED DESCRIPTION OF PREFERRED EMBODIMENT

Reference will now be made in detail to the preferred embodiments of the present invention, examples of which are illustrated in the accompanying drawings.

Figure 1:
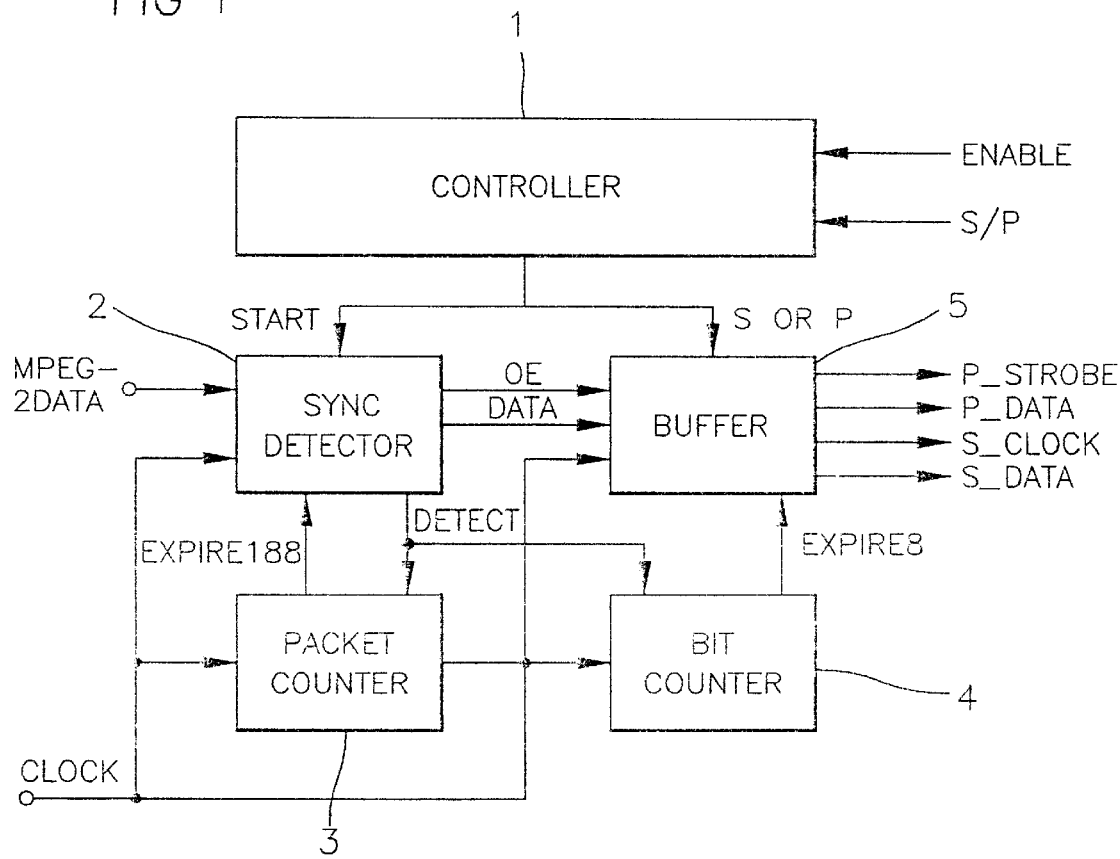

FIG. 1 is a block diagram of an MPEG-2 transport stream packet detector according to the present invention. The detector of this invention consists of: controller 1 for receiving signals, ENABLE and S/P, determining a detection time point and a series/parallel output method, respectively and generating a detection start signal, START, and a series/parallel output control signal, S or P; sync detector 2 for detecting an MPEG-2 transport stream packet sync from data, MPEG-2 DATA, transmitted from network, according to the detection start point, START, from controller 1; packet counter 3 for counting the predetermined number of bytes according to a detection signal, DETECT, from sync detector 2, and sending a packet reception completion signal, EXPIRE188, to sync detector 2 when finishing counting the predetermined number of bytes; bit counter 4 for counting the predetermined number of bits according to the detection signal, DETECT, from sync detector 2, and generating a signal, EXPIRE8, which is for converting series data to parallel data when finishing counting the predetermined number of bits; and buffer 5 for converting the series data and clocks from sync detector 2 into parallel data and strobe signal, P_DATA and P_STROBE, according to the signal, EXPIRE8, from bit counter 4, and outputting the data and clocks restored in series or parallel according to the series/parallel control signal, S or P, from controller 1.

Figure 2:
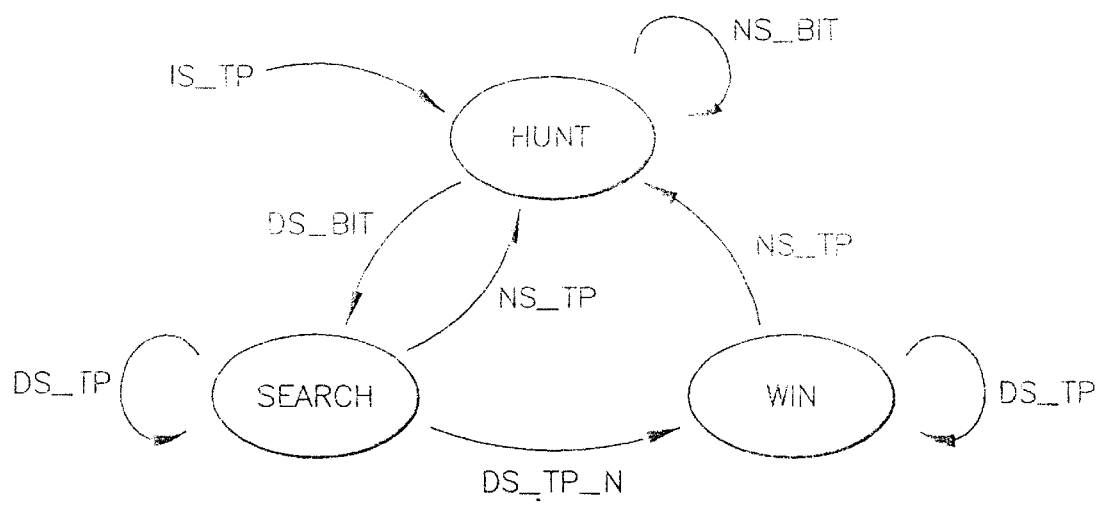

The operation of the MPEG-2 transport stream packet detector according to the present invention, is described below with reference to FIG. 2.

The overall operation states transition during the MPEG-2 transport stream packet detection, is as follows.

In the first state, HUNT, stream data, IS_TP, from network is received by an MPEG-2 transport stream packet detector, and the stream data input is checked at every bits so as to search for the sync byte (0*47) since the moment of the stream data is arbitrary. If the sync byte is not detected from the bit (NS_TP), the next bit is received and searched for a sync byte. If the sync byte is found from the bit (DS_BIT), the state progresses to SEARCH. In SEARCH state, every transport packet (188 bytes) is searched for a sync byte. If the sync byte is found at every packet in a normal state (DS_TP), the number of searching is increased by one whenever finding the sync byte. If the sync byte is not found while searching for the sync byte (NS_TP), the process goes back to HUNT state. When the number of searching for the sync byte reaches N (DS_TP_N), the process goes to WIN state. WIN state is kept as far as the sync byte is found at every packet in a normal state (DS_TP). If the sync byte is not found (NS_TP), the process goes back to HUNT state to newly search for the sync byte starting from the first time.

The following is the description of the actual operation of detecting the sync pattern from an MPEG-2 transport stream packet with reference to FIG. 1.

Controller 1 receives ENABLE signal notifying a detection point and a series/parallel signal, S/P, designating an output method, and generates a detection start control signal, START, and an output method control signal, S or P.

When receiving the detection start signal, START, sync detector 2 searches MPEG-2 transport stream packet data (MPEG-2 DATA) transmitted from network for a packet sync pattern (0*47) of the MPEG-2 transport stream at every clock input. Detection signal, DETECT, which starts packet counter 3 and bit counter 4, is not declared, thus packet counter 3 and bit counter 4 become OFF. When the packet sync pattern is detected, the detection signal, DETECT, is declared, thus packet counter 3 and bit counter 4 start. Sync detector 2 stops detecting the packet sync pattern after starting packet counter 3 until the signal, EXPIRE188, indicating the completion of packet reception, is received from packet counter 3 which is a 188-byte counter. As soon as the packet reception completion signal, EXPIRE188, is received, sync detector 2 starts to detect a packet sync pattern. If the packet sync patterns are correctly detected more than N times, sync detector 2 generates and transmits an output enable signal, OE, to buffer 5 to output the data stored in buffer 5.

Once the detection signal, DETECT, is declared, packet counter 3, as a 188-byte counter, counts bytes at every clock up to 188 bytes. If 188-byte data is received, packet counter declares the packet reception completion signal, EXPIRE188, and notifies sync detector 2 of the fact that one MPEG-2 transport packet has been received. Packet counter 3 stops counting anytime if the detection signal, DETECT, is not declared.

Bit counter 4, as an 8-bit counter, performs the same operation as packet counter 3. If the count is 8, bit counter 4 transmits an 8-bit completion signal, EXPIRE8, to buffer 5. The 8-bit completion signal, EXPIRE8, which is for converting series data input into parallel data, is applied when arranging the MPEG-2 transport stream in units of byte.

Buffer 4 outputs the data transmitted from sync detector 2 as series data, S_DATA, according to an output method control signal, S or P, from controller 1, and converts series data input into parallel data, P_DATA, according to the signal, EXPIRE8, generated by bit counter 4. An output point depends on the output enable signal, OE, generated by sync detector 2. Buffer 5 outputs series clocks, S_CLOCK, when outputting series data, S_DATA, and outputs parallel strobe signal, P_STROBE, when outputting parallel data, P_DATA.

As illustrated, the present invention detects a sync at every bit and every packet from an MPEG-2 transport stream in a usual method according to a state transition, thereby achieving stable sync detection. It also selectively outputs data in series or parallel type.

It will be apparent to those skilled in the art that various modifications and variations can be made in an MPEG-2 transport stream packet detection device and its method of the present invention without deviating from the spirit or scope of the invention. Thus, it is intended that the present invention cover the modifications and variations of this invention provided they come within the scope of the appended claims and their equivalents.

What is claimed is:

1. In a device restoring data and clock from an MPEG-2 transport stream packet transmitted from network, an MPEG-2 transport stream packet detection device comprising:

a controller for receiving signals determining a detection time point and a series/parallel output method, and generating a detection start control signal and a series/parallel output control signal;

a sync detector for detecting an MPEG-2 transport stream packet sync from MPEG-2 transport stream data transmitted from the network according to the detection start signal from the controller;

a packet counter for counting a predetermined number of bytes according to a sync detection signal from the sync detector and sending a packet reception completion signal to the sync detector when finishing counting the predetermined number of bytes during a declaration of the detection signal;

a bit counter for counting a predetermined number of bits according to the sync detection signal from the sync detector and generating a signal for converting series data to parallel data when finishing counting the bits during the declaration of the detection signal; and a buffer for converting the series data and clock from the sync detector into parallel data and strobe signal according to the signal generated by the bit counter, and outputting the data and clock in series or parallel according to the series/parallel output control signal generated by the controller.

2. The device according to claim 1, wherein the sync detector detects a packet sync pattern of the MPEG-2 transport stream from the MPEG-2 transport stream data input at every clock, stops detecting the packet sync after generating the sync detection signal until the packet reception completion signal is received from the packet counter, and sends a signal commanding an output of the data to the buffer when the packet sync patterns are normally detected more than a predetermined number.

3. The device according to claim 1, wherein the packet counter is a 188-counter which performs counting in units of packet when the sync detection signal is generated by the sync detector, and sends the packet reception completion signal indicating that the reception of one packet is completed, to the sync detector when a packet count is 188.

4. The device according to claim 1, wherein the bit counter is an 8-counter which counts input clocks eight times when the sync detection signal is generated by the sync detector, and sends the signal, for converting series data into parallel data, to the buffer after finishing counting the clocks eight times during the declaration of the detection signal.

5. In a method restoring data and clock from an MPEG-2 transport stream packet transmitted from network, an MPEG-2 transport stream packet detection method comprising the steps of:

searching an MPEG-2 transport stream input for a sync byte in units of bit in a hunt state;

progressing to a search state if the sync byte is detected, searching input data for the sync byte in units of transport packet, and increasing the number of the transport packets by a predetermined number when finding out the sync byte;

progressing to a win state if the number of transport packets is more than a predetermined number in the search state; and keeping the win state if the sync byte is normally found at every packet, and progressing to the hunt state if the sync byte is not found at every packet to restart a detection of the sync byte.

6. The method according to claim 5, further comprising the step of searching the next bit for the sync byte if the sync byte is not found in a bit firstly input.

7. The method according to claim 5, further comprising the step of progressing to the hunt state if the sync byte is not found in input data while searching in units of transport packet in the search state.

* * * * *